(12) United States Patent
Mackay

(10) Patent No.: US 6,386,093 B1
(45) Date of Patent: May 14, 2002

(54) GRILL FLAME-UP SUPPRESSOR

(76) Inventor: John D. Mackay, 7601 E. Treasure Dr., #908, Miami, FL (US) 33141

( * ) Notice: Subject to any disclaimer, the term of this patent is extended or adjusted under 35 U.S.C. 154(b) by 0 days.

(21) Appl. No.: 09/880,500

(22) Filed: Jun. 12, 2001

(51) Int. Cl.[7] .......................... A47J 37/00; A47J 37/04; A47J 37/07

(52) U.S. Cl. .............................. 99/339; 99/340; 99/400; 99/401; 99/446; 99/447; 99/482; 126/25 R; 126/41 R

(58) Field of Search .......................... 99/330, 331, 339, 99/340, 352–355, 400, 401, 417, 444–450, 481, 482; 126/25 R, 9 R, 41 R, 346, 201, 344, 361; 122/19.2, 494

(56) References Cited

U.S. PATENT DOCUMENTS

| | | | |
|---|---|---|---|
| 3,109,359 A | | 11/1963 | Falla ............................. 99/339 |
| 3,611,915 A | * | 10/1971 | Glaser et al. ............. 99/339 X |
| 3,714,937 A | * | 2/1973 | Linstead ................... 126/25 R |
| 3,734,076 A | * | 5/1973 | Kiziol ...................... 126/25 R |
| 4,355,570 A | * | 10/1982 | Martin et al. ............. 99/482 X |
| 4,453,530 A | * | 6/1984 | Schlosser .................. 99/339 X |
| 4,523,574 A | * | 6/1985 | Schlosser .................. 126/41 R |
| 4,635,613 A | * | 1/1987 | Tucker et al. ............. 126/41 R |
| 4,700,618 A | * | 10/1987 | Cox, Jr. .................... 99/340 X |
| 4,810,510 A | * | 3/1989 | Lever et al. .............. 99/482 X |
| 4,913,039 A | | 4/1990 | Sutphen ....................... 99/339 |
| 5,070,777 A | * | 12/1991 | Novak ...................... 99/482 X |
| 5,168,796 A | * | 12/1992 | Porton et al. ................. 99/340 |
| 5,189,945 A | | 3/1993 | Hennick ...................... 99/339 |
| 5,353,880 A | * | 10/1994 | Green ...................... 126/41 R |
| 5,404,795 A | | 4/1995 | Coble .......................... 99/339 |
| 5,511,466 A | | 4/1996 | Dzibinski .................... 99/339 |
| 5,528,984 A | | 6/1996 | Saurwein .................... 99/482 |
| 5,967,138 A | * | 10/1999 | Cacace ....................... 126/361 |

* cited by examiner

Primary Examiner—Timothy F. Simone
(74) Attorney, Agent, or Firm—Joseph N. Breaux

(57) ABSTRACT

A grill flame-up suppressor that includes a bottom container assembly, a vent cap assembly and a lifting tong assembly; the bottom container assembly being constructed from a heat resistant metal in the general shape of an open topped can having a flanged lip opening edge and a circumferential inwardly directed indentation about one third up from a bottom surface of the bottom container assembly upon which a removable heat resistant flavoring agent support screen is supported.

1 Claim, 2 Drawing Sheets

GRILL FLAME-UP SUPPRESSOR

TECHNICAL FIELD

The present invention relates to grilling and bar-b-que accessories and more particularly to a grill flame-up suppressor that includes a bottom container assembly, a vent cap assembly and a lifting tong assembly; the bottom container assembly being constructed from a heat resistant metal in the general shape of an open topped can having a flanged lip opening edge and a circumferential inwardly directed indentation about one third up from a bottom surface of the bottom container assembly upon which a removable heat resistant flavoring agent support screen is supported; the vent cap assembly including a lip opening insertion portion sized and shaped to frictionally fit into an opening of the bottom container assembly defined by the flanged lip opening edge and a top cap member having a circumferential side surface provided within a number of angularly oriented spout opening each in connection with a spout tube directed downwardly from a top surface of the top cap member and in a general downward direction with respect to the bottom container assembly; the lifting tong assembly including a pair of cap clips provided at either end of a resilient spring steel tong assembly, the cap clips being held together in a gripping position against the vent cap by a slidable retaining ring slidably mounted on the resilient spring steel tong assembly; the bottom container assembly being fillable with water and positionable within a bed of burning coals or the like wherein the water turns to steam and is ejected over the cooking surface to extinguishing flame-ups that can occur during cooking; in addition as the steam passes through flavoring agents positioned on the flavoring agent support screen, the steam picks up flavors which are then transferred to food items cooked on the grill.

BACKGROUND ART

Grilling food creates flavors that cannot be duplicated by other cooking methods. Unfortunately during the grilling or bar-b-queing process dripping grease and the like can cause flare ups which can burn or otherwise create unpleasant flavors on the food being grilled. It would be a benefit, therefore, to have a flame-up suppressor for suppressing flame-ups and, thereby, preventing unpleasant flavors from being transferred to the cooking food. Because grilling can infuse the food with various smokey and other flavors, it would be a further benefit to have a flame-up suppressor that generated steam which carried flavoring agents to coat or otherwise transfer chosen flavors to the food being cooked.

GENERAL SUMMARY DISCUSSION OF INVENTION

It is thus an object of the invention to provide a grill flame-up suppressor that includes a bottom container assembly, a vent cap assembly and a lifting tong assembly; the bottom container assembly being constructed from a heat resistant metal in the general shape of an open topped can having a flanged lip opening edge and a circumferential inwardly directed indentation about one third up from a bottom surface of the bottom container assembly upon which a removable heat resistant flavoring agent support screen is supported; the vent cap assembly including a lip opening insertion portion sized and shaped to frictionally fit into an opening of the bottom container assembly defined by the flanged lip opening edge and a top cap member having a circumferential side surface provided within a number of angularly oriented spout opening each in connection with a spout tube directed downwardly from a top surface of the top cap member and in a general downward direction with respect to the bottom container assembly; the lifting tong assembly including a pair of cap clips provided at either end of a resilient spring steel tong assembly, the cap clips being held together in a gripping position against the vent cap by a slidable retaining ring slidably mounted on the resilient spring steel tong assembly; the bottom container assembly being fillable with water and positionable within a bed of burning coals or the like wherein the water turns to steam and is ejected over the cooking surface to extinguishing flame-ups that can occur during cooking; in addition as the steam passes through flavoring agents positioned on the flavoring agent support screen, the steam picks up flavors which are then transferred to food items cooked on the grill.

Accordingly, a grill flame-up suppressor is provided. The grill flame-up suppressor includes a bottom container assembly, a vent cap assembly and a lifting tong assembly; the bottom container assembly being constructed from a heat resistant metal in the general shape of an open topped can having a flanged lip opening edge and a circumferential inwardly directed indentation about one third up from a bottom surface of the bottom container assembly upon which a removable heat resistant flavoring agent support screen is supported; the vent cap assembly including a lip opening insertion portion sized and shaped to frictionally fit into an opening of the bottom container assembly defined by the flanged lip opening edge and a top cap member having a circumferential side surface provided within a number of angularly oriented spout opening each in connection with a spout tube directed downwardly from a top surface of the top cap member and in a general downward direction with respect to the bottom container assembly; the lifting tong assembly including a pair of cap clips provided at either end of a resilient spring steel tong assembly, the cap clips being held together in a gripping position against the vent cap by a slidable retaining ring slidably mounted on the resilient spring steel tong assembly; the bottom container assembly being fillable with water and positionable within a bed of burning coals or the like wherein the water turns to steam and is ejected over the cooking surface to extinguishing flame-ups that can occur during cooking; in addition as the steam passes through flavoring agents positioned on the flavoring agent support screen, the steam picks up flavors which are then transferred to food items cooked on the grill.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

EXEMPLARY MODE FOR CARRYING OUT THE INVENTION

Figure 1:
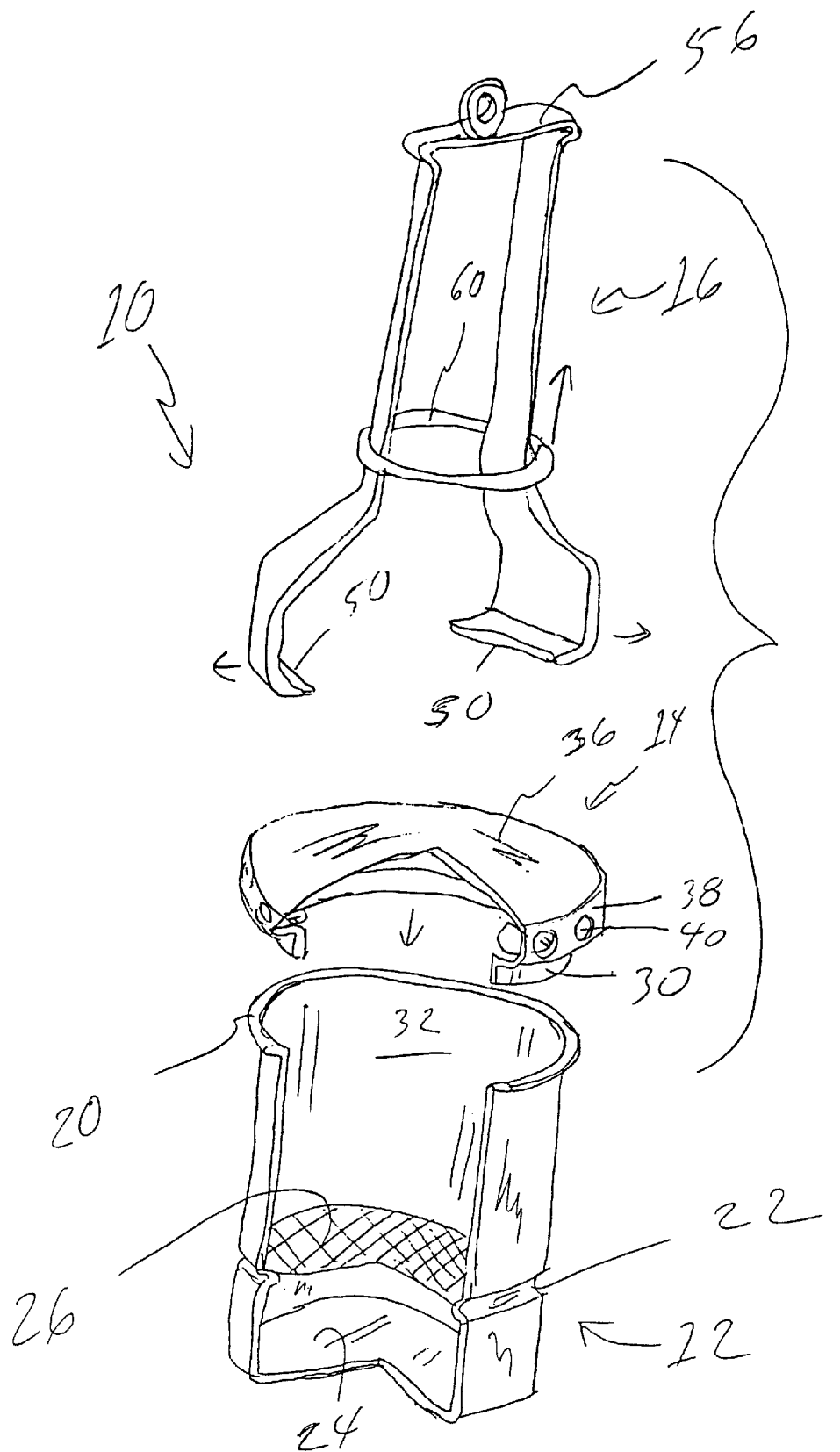
FIG. 1 is an exploded, partial cutaway, perspective view of an exemplary embodiment of the grill flame-up suppressor of the present invention showing the bottom container assembly, the vent cap assembly and the lifting tong assembly; the bottom container assembly being constructed from a heat resistant metal in the general shape of an open topped can having a flanged lip opening edge and a circumferential inwardly directed indentation about one third up from a bottom surface of the bottom container assembly upon which a removable heat resistant flavoring agent support screen is supported; the vent cap assembly including a lip opening insertion portion sized and shaped to frictionally fit into an opening of the bottom container assembly defined by the flanged lip opening edge and a top cap member having a circumferential side surface provided within a number of angularly oriented spout opening each in connection with a spout tube directed downwardly from a top surface of the top cap member and in a general downward direction with respect to the bottom container assembly; the lifting tong assembly including a pair of cap clips provided at either end of a resilient spring steel tong assembly, the cap clips being held together in a gripping position against the vent cap by a slidable retaining ring slidably mounted on the resilient spring steel tong assembly; the bottom container assembly being fillable with water and positionable within a bed of burning coals or the like wherein the water turns steam and is ejected over the cooking surface to extinguishing flame-ups that can occur during cooking; in addition as the steam passes through flavoring agents positioned on the flavoring agent support screen, the steam picks up flavors which are then transferred to food items cooked on the grill.

FIG. 1 shows an exemaplry embodiment of the grill flame-up suppressor of the present invention generally desginated 10. Grill flame-up suppressor 10 includes a bottom container assembly, generally desginated 12; a vent cap assembly, generally desginated 14; and a lifting tong assembly, generally desginated 16.

Bottom container assembly 12 is constructed of steel in the general shape of an open topped can having a circular flanged lip opening edge 20 and a circumferential inwardly directed indentation 22 about one third up from a bottom surface 24 of bottom container assembly 12 upon which a removable heat resistant flavoring agent support screen 26 is supported. Support screen 26 is used for supporting herbs, garlic, onions wood chips and other flavoring agents above a quantity of water positioned within the bottom of bottom container assembly below support screen 26.

Figure 3:
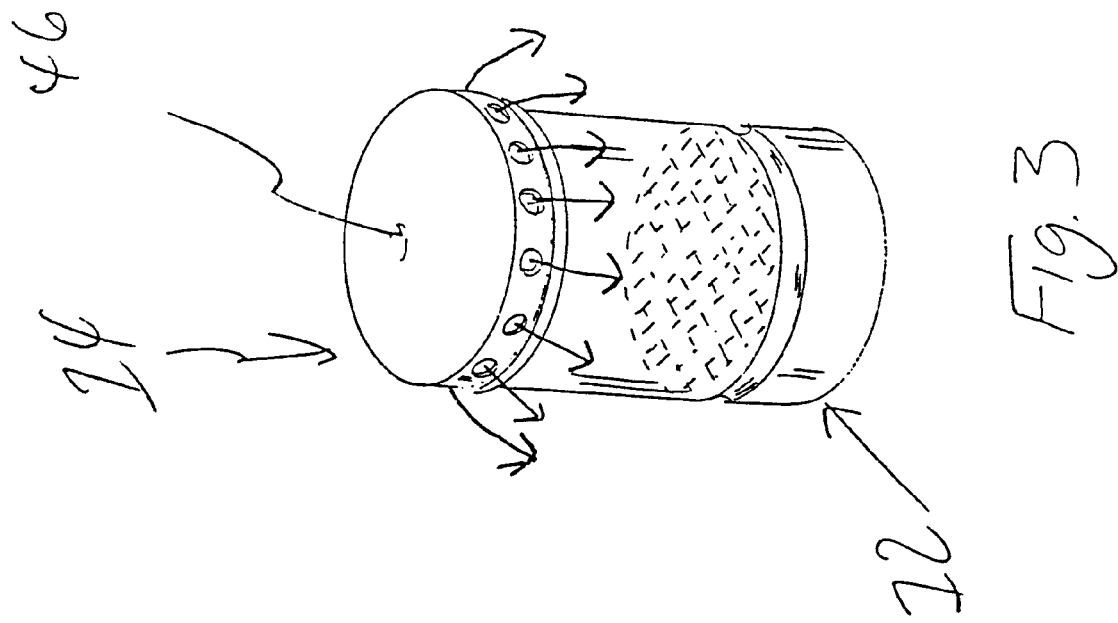
FIG. 3 is a perspective view showing the vent cap assembly friction fit into the bottom container assembly with flavor carrying steam being vented downwardly out through the angularly oriented spout openings.
Figure 2:
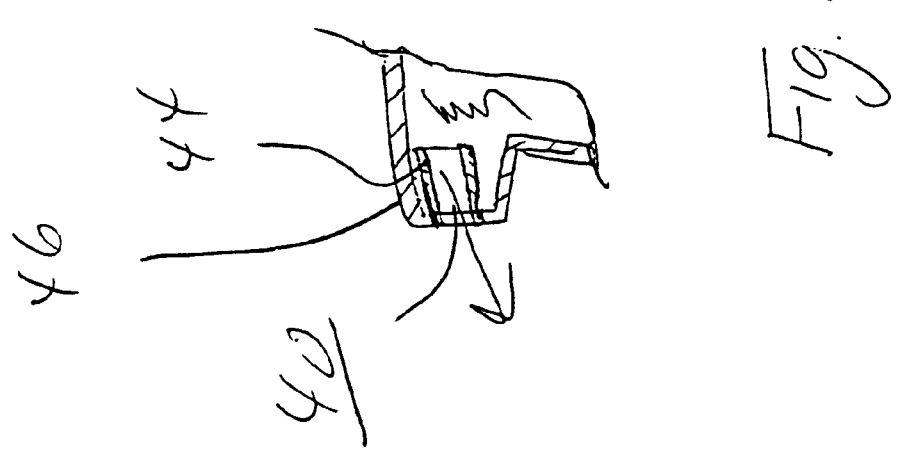
FIG. 2 is a detail sectional view showing one of the number of angularly oriented spout openings in connection with a spout tube directed downwardly from a top surface of the top cap member.

Vent cap assembly 14 is cosntructed of molded metal and includes a lip opening insertion portion 30 sized and shaped to frictionally fit into an opening 32 of bottom container assembly 12 defined by flanged lip opening edge 20 and a top cap member 36 having a circumferential side surface 38 provided within a number of angularly oriented spout openings 40. Referring now to FIG. 2, each spout opening 40 is in connection with a spout tube 44 that is directed downwardly from, referring now to FIG. 3, a top surface 46 of top cap member 14 and in a general downward direction with respect to the bottom container assembly 12.

Referring back to FIG. 1, lifting tong assembly 16 includes a pair of cap clips 50 provided at either end of a resilient spring steel tong assembly 56. In use, the cap clips 50 are held together in a gripping position against vent cap 14 by a slidable retaining ring 60 slidably mounted on the resilient spring steel tong assembly 56.

In use bottom container assembly 12 is filled with water and positioned within a bed of burning coals or the like wherein the water turns to steam and is ejected over the cooking surface to extinguish flame-ups that can occur during cooking. In addition as the steam passes through flavoring agents positioned on the flavoring agent support screen 26, the steam picks up flavors which are then transferred to food items cooked on the grill.

It can be seen from the preceding description that a grill flame-up suppressor has been provided that includes a bottom container assembly, a vent cap assembly and a lifting tong assembly; the bottom container assembly being constructed from a heat resistant metal in the general shape of an open topped can having a flanged lip opening edge and a circumferential inwardly directed indentation about one third up from a bottom surface of the bottom container assembly upon which a removable heat resistant flavoring agent support screen is supported; the vent cap assembly including a lip opening insertion portion sized and shaped to frictionally fit into an opening of the bottom container assembly defined by the flanged lip opening edge and a top cap member having a circumferential side surface provided within a number of angularly oriented spout opening each in connection with a spout tube directed downwardly from a top surface of the top cap member and in a general downward direction with respect to the bottom container assembly; the lifting tong assembly including a pair of cap clips provided at either end of a resilient spring steel tong assembly, the cap clips being held together in a gripping position against the vent cap by a slidable retaining ring slidably mounted on the resilient spring steel tong assembly; the bottom container assembly being fillable with water and positionable within a bed of burning coals or the like wherein the water turns to steam and is ejected over the cooking surface to extinguishing flame-ups that can occur during cooking; in addition as the steam passes through flavoring agents positioned on the flavoring agent support screen, the steam picks up flavors which are then transferred to food items cooked on the grill.

It is noted that the embodiment of the grill flame-up suppressor described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A grill flame-up suppressor for use comprising:
a bottom container assembly;
a vent cap assembly and a lifting tong assembly;
said bottom container assembly being constructed from a heat resistant metal in said general shape of an open topped can having a flanged lip opening edge and a circumferential inwardly directed indentation about one third up from a bottom surface of said bottom container assembly upon which a removable heat resistant flavoring agent support screen is supported;
said vent cap assembly including a lip opening insertion portion sized and shaped to frictionally fit into an opening of said bottom container assembly defined by said flanged lip opening edge and a top cap member having a circumferential side surface provided within a number of angularly oriented spout opening each in connection with a spout tube directed downwardly from a top surface of said top cap member and in a general downward direction with respect to said bottom container assembly;
said lifting tong assembly including a pair of cap clips provided at either end of a resilient spring steel tong assembly, said cap clips being held together in a gripping position against said vent cap by a slidable retaining ring slidably mounted on said resilient spring steel tong assembly;

said bottom container assembly being fillable with water and positionable within a bed of burning coals wherein said water turns to steam and is ejected over said cooking surface to extinguishing flame-ups that can occur during cooking; in addition as said steam passes through flavoring agents positioned on said flavoring agent support screen, said steam picks up flavors which are then transferred to food items cooked on said grill.

* * * * *